(12) United States Patent
Odaka

(10) Patent No.: US 9,360,494 B2
(45) Date of Patent: Jun. 7, 2016

(54) ROTATION DETECTOR AND METHOD OF PRODUCING A ROTOR IN THE ROTATION DETECTOR

(75) Inventor: Shunichi Odaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 720 days.

(21) Appl. No.: 13/569,561

(22) Filed: Aug. 8, 2012

(65) Prior Publication Data

US 2013/0057261 A1   Mar. 7, 2013

(30) Foreign Application Priority Data

Sep. 6, 2011   (JP) ................................. 2011-193658

(51) Int. Cl.
| | | |
|---|---|---|
| G01B 7/14 | (2006.01) | |
| G01B 7/30 | (2006.01) | |
| H01F 5/00 | (2006.01) | |
| G01P 3/488 | (2006.01) | |
| G01D 5/14 | (2006.01) | |

(52) U.S. Cl.
CPC ............... *G01P 3/488* (2013.01); *G01D 5/147* (2013.01)

(58) Field of Classification Search
CPC .............. G01B 7/14; G01B 7/30; H01F 5/00; G01P 3/488; G01D 5/147
USPC ............................ 324/207.15, 207.23, 207.25
See application file for complete search history.

(56) References Cited

U.S. PATENT DOCUMENTS

| 5,570,016 A | * | 10/1996 | Schroeder et al. | ........ 324/207.25 |
| 5,714,883 A | * | 2/1998 | Schroeder et al. | ........ 324/207.22 |
| 5,729,127 A | * | 3/1998 | Tamura | ................. G01D 5/147 |
| | | | | 324/174 |
| 6,486,658 B2 | * | 11/2002 | Naidu | ........................ 324/207.21 |
| 6,559,638 B1 | * | 5/2003 | Adelerhof | .................. 324/207.21 |
| 7,084,619 B2 | * | 8/2006 | Butzmann | ...................... 324/165 |

(Continued)

FOREIGN PATENT DOCUMENTS

| DE | 102013226394 A1 | * | 6/2015 | ............. F16H 59/38 |
| EP | 0539602 A1 | | 5/1993 | |

(Continued)

OTHER PUBLICATIONS

Nimmrichter, "Cogged Wheel Rotary Encoder", English translation (EP2392899 A2).*

*Primary Examiner* — Patrick Assouad
*Assistant Examiner* — Lamarr Brown
(74) *Attorney, Agent, or Firm* — Hauptman Ham, LLP

(57) ABSTRACT

A rotor (1b) includes a first cylindrical portion (10), and a second cylindrical portion (20) including a first partial circumferential surface (21) having a width narrower than that of the first cylindrical portion (10) in the circumferential direction, and a second partial circumferential surface (22) having a radius smaller than a radius of the first partial circumferential surface; the rotor, further, including a first to-be-detected portion having a plurality of teeth (15), and a second to-be-detected portion having at least one tooth (25), and wherein the at least one tooth of the second cylindrical portion and the tooth of the first cylindrical portion corresponding to the at least one tooth are formed in one operation by machining.

5 Claims, 7 Drawing Sheets

(56) References Cited

U.S. PATENT DOCUMENTS

| | | | |
|---|---|---|---|
| 7,400,141 B2 * | 7/2008 | Taniguchi et al. | 324/207.25 |
| 7,997,391 B2 * | 8/2011 | Burgoon et al. | 188/218 XL |
| 8,164,009 B2 * | 4/2012 | Kagami et al. | 200/14 |
| 8,816,678 B2 * | 8/2014 | Kitanaka | G01D 5/147 324/207.11 |
| 2005/0258820 A1 * | 11/2005 | Forster | G01D 5/145 324/165 |
| 2006/0162487 A1 * | 7/2006 | Chappelear | B62M 11/00 74/567 |
| 2008/0083168 A1 * | 4/2008 | Booth | E05F 15/646 49/360 |
| 2009/0001843 A1 * | 1/2009 | Enomoto et al. | 310/257 |
| 2011/0080162 A1 * | 4/2011 | Steinich | G01B 7/30 324/207.25 |
| 2012/0152034 A1 * | 6/2012 | Kaess | B62D 6/10 73/862.333 |

FOREIGN PATENT DOCUMENTS

| | | | |
|---|---|---|---|
| EP | 2392899 A2 * | 12/2011 | G01D 5/2457 |
| JP | 4335111 A | 11/1992 | |
| JP | 4085074 B2 | 2/2008 | |

* cited by examiner

ROTATION DETECTOR AND METHOD OF PRODUCING A ROTOR IN THE ROTATION DETECTOR

RELATED APPLICATIONS

The present application claims priority from Japanese Application No. 2011-193658, filed Sep. 6, 2011, the disclosure of which is hereby incorporated by reference herein in its entirety.

BACKGROUND OF THE INVENTION

1. Technical Field

This invention relates to a rotation detector and to a method of producing a rotor in the rotation detector.

2. Description of the Related Art

A rotation detector for detecting the angle of rotation of a rotary member by utilizing magnetism is known as a magnetic encoder. The rotation detector includes a part that is periodically indented, such as a gear.

FIG. 9 is an exploded perspective view of a rotor in a rotation detector according to a prior art. As shown in FIG. 9, the conventional rotation detector includes a gear 100 for detecting position signals to detect the rotational position and the speed of rotation, and a ring 200 for detecting a signal of one rotation to detect the position of origin in one rotation. These gear 100 and ring 200 are overlapped concentrically to constitute a rotor. In the prior art, in order to attach the gear 100 and the ring 200 concentrically to each other thereby maintaining high precision, the gear 100 and the ring 200 must be precisely machined.

Therefore, according to Japanese Patent No. 4085074, a single gear is formed and, thereafter, a single groove is formed in the gear in the circumferential direction to separate it into an upper part and a lower part. Then, for example, the upper part is ground leaving only one tooth.

Japanese Unexamined Patent Publication No. 4-335111 proposes a method of forming, as a unitary structure, a gear 100 for detecting position signals and a single tooth on a ring for detecting a signal of one rotation by forming and sintering a magnetic material.

However, according to Japanese Patent No. 4085074, the teeth are once all formed even on the upper part and are, thereafter, all ground leaving one tooth accompanied, therefore, resulting in very low working efficiency.

Japanese Unexamined Patent Publication No. 4-335111 can be applied only to a case where the rotor can be produced by using a material that can be sintered. Therefore, when it is attempted to produce a rotor by using steel to attain higher strength, the method disclosed by Japanese Unexamined Patent Publication No. 4-335111 cannot be applied.

The present invention was accomplished in view of the above circumstances and has an object of providing a rotation detector including a rotor that can be efficiently produced by machining.

SUMMARY OF THE INVENTION

In order to achieve the above object according to a first aspect, there is provided a rotation detector including a rotor, a magnetic field generator fixed to face the rotor and generates a magnetic field, and a detector unit arranged between the rotor and the magnetic field generator to detect signals that vary responsive to changes in the magnetic field caused the rotation of the rotor; wherein the rotor includes a first cylindrical portion having one or a plurality of steps, and a second cylindrical portion having one or a plurality of steps and arranged in concentric with the first cylindrical portion and being deviated in the axial direction; and the second cylindrical portion includes a first partial circumferential surface having a width narrower than that of the first cylindrical portion in the circumferential direction, and a second partial circumferential surface having a radius smaller than a radius of the first partial circumferential surface;

the rotor, further, including:

a first to-be-detected portion having a plurality of teeth formed on each of the steps of the first cylindrical portion; and a second to-be-detected portion having at least one tooth in phase with, and in the same shape and size as, the tooth of the first to-be-detected portion, the at least one tooth being formed on the first partial circumferential surface of the second cylindrical portion; and wherein the at least one tooth of the second cylindrical portion and a tooth of the first cylindrical portion corresponding to the at least one tooth are formed in one operation by machining.

According to a second aspect as set forth in the first aspect, the radius of the first partial circumferential surface of the second cylindrical portion is the same as the radius of the first cylindrical portion.

According to a third aspect as set forth in the first aspect, a groove is formed between the second cylindrical portion and the first cylindrical portion.

According to a fourth aspect as set forth in the first aspect, the second partial circumferential surface of the second cylindrical portion is positioned on the inside of the bottom of teeth of the first to-be-detected portion in the radial direction.

According to a fifth aspect, there is provided a method of producing a rotor in a rotation detector that includes a rotor, a magnetic field generator fixed to face the rotor and generates a magnetic field, and a detector unit arranged between the rotor and the magnetic field generator to detect signals that vary responsive to changes in the magnetic field caused the rotation of the rotor, comprising the steps of:

preparing a rotor blank that including a first cylindrical portion having one or a plurality of steps, and a second cylindrical portion having one or a plurality of steps and arranged in concentric with the first cylindrical portion and being deviated in the axial direction;

the second cylindrical portion including a first partial circumferential surface having a width narrower than that of the first cylindrical portion in the circumferential direction, and a second partial circumferential surface having a radius smaller than a radius of the first partial circumferential surface; and forming, in one operation by machining, a first to-be-detected portion having a plurality of teeth formed on each of the steps of the first cylindrical portion, and a second to-be-detected portion having at least one tooth formed on the first partial circumferential surface of the second cylindrical portion in phase with, and in the same shape and size as, the tooth of the first to-be-detected portion.

According to a sixth aspect as set forth in the fifth aspect, the radius of the first partial circumferential surface of the second cylindrical portion is the same as the radius of the first cylindrical portion.

According to a seventh aspect as set forth in the fifth aspect, a groove is formed between the second cylindrical portion and the first cylindrical portion.

According to an eighth aspect as set forth in the fifth aspect, the second partial circumferential surface of the second cylindrical portion is positioned on the inside of the bottom of teeth of the first to-be-detected portion in the radial direction.

These and other objects, features and advantages of the present invention will be more apparent in light of the detailed description of exemplary embodiments thereof as illustrated by the drawings.

DETAILED DESCRIPTION

Figure 1A:
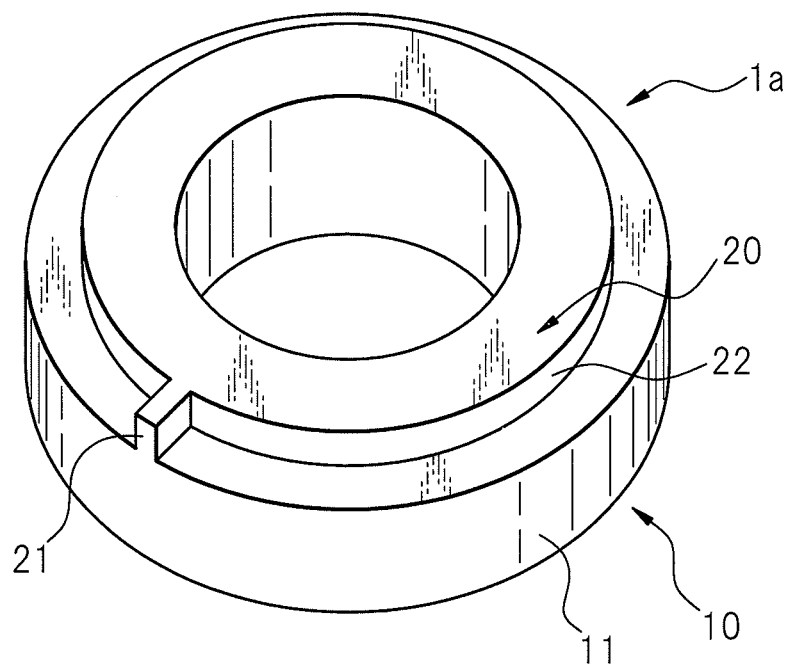
FIG. 1A is a perspective view of a rotor blank based on a first embodiment of the present invention.

Embodiments of the invention will now be described with reference to the accompanying drawings in which the same members are denoted by the same reference numerals. For easy comprehension, the drawings are arbitrarily scaled.

Figure 1B:
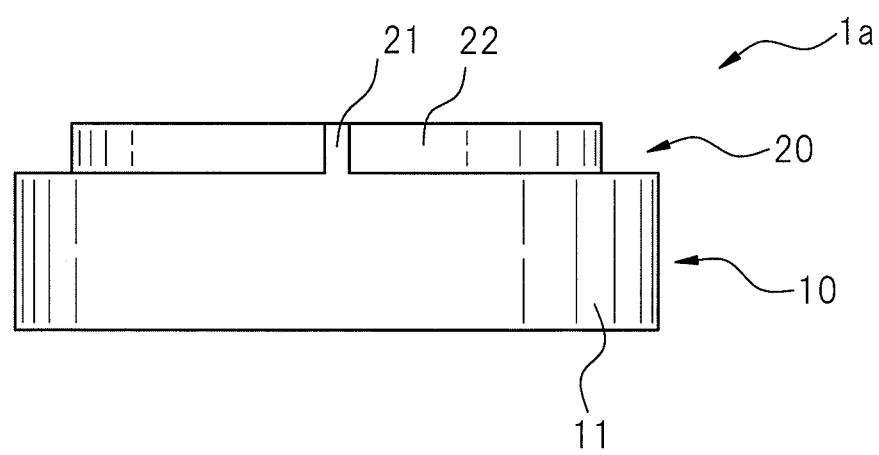
FIG. 1B is a side view of the rotor blank shown in FIG. 1A.

FIG. 1A is a perspective view of a rotor blank based on a first embodiment of the present invention, and FIG. 1B is a side view of the rotor blank shown in FIG. 1A. The rotor blank stands for a member in a state prior to forming teeth.

In the drawings, the rotor blank 1a includes a first cylindrical portion 10 and a second cylindrical portion 20 which is in concentric with the first cylindrical portion 10 and is deviated in the axial direction. As shown, the circumferential surface of the second cylindrical portion 20 includes a first partial circumferential surface 21 which is in flush with a circumferential surface 11 of the first cylindrical portion 10 and a second partial circumferential surface 22 having a radius smaller than a radius of the first cylindrical portion 10. In this connection, the first partial circumferential surface 21 has a radius equal to the radius of the first cylindrical portion 10 and is continuous to the circumferential surface 11 of the first cylindrical portion 10.

In the first embodiment, the width of the first partial circumferential surface 21 (length in the circumferential direction) is nearly equal to a pitch of the tooth formed in a subsequent step. Further, the second partial circumferential surface 22 is positioned closer to the center of the rotor blank 1a than the bottom of the teeth formed on the circumferential surface 11 of the first cylindrical portion 10. In other words, the second partial circumferential surface 22 is inwardly spaced, in the radial direction, from the bottom of the teeth formed on the circumferential surface 11 of the first cylindrical portion 10.

It is preferable that the rotor blank 1a that is shown is produced from a metal material such as steel by the machining work such as turning or milling. However, it is also possible to produce the rotor blank 1a by the forming work such as sintering.

Then, described below is the step of forming the tooth on the rotor blank 1a.

The teeth can be formed by either the generating work or the forming work, and the working method is not specified in the invention. Described below is an example of when the rotor blank is ground by a gear grinder (not shown) using a worm-shaped grindstone.

After the rotor blank 1a is fixed to a workpiece shaft of the gear grinder, the origin of index of the rotor blank 1a is determined by a tooth-meeting device mounted on the gear grinder. Concretely, the origin of index is determined by detecting, by using the tooth-meeting device, the surface that connects to the first partial circumferential surface 21 that has been determined in advance. The tooth-meeting device is normally mounted on the gear grinder. For instance, the surface of any gear tooth of the tooth-meeting device is brought in contact with a touch probe by rotating the workpiece shaft, and the phase of rotation of the workpiece shaft at that moment is regarded to be the origin. The origin may be determined by using a non-contact type sensor.

After the origin has been determined, the grinding starts from a predetermined grind-start position so that the tooth of a predetermined shape is formed on the first partial circumferential surface 21. In the first embodiment, the grind-start position is so determined that a single tooth is formed on the first partial circumferential surface 21.

Figure 2A:
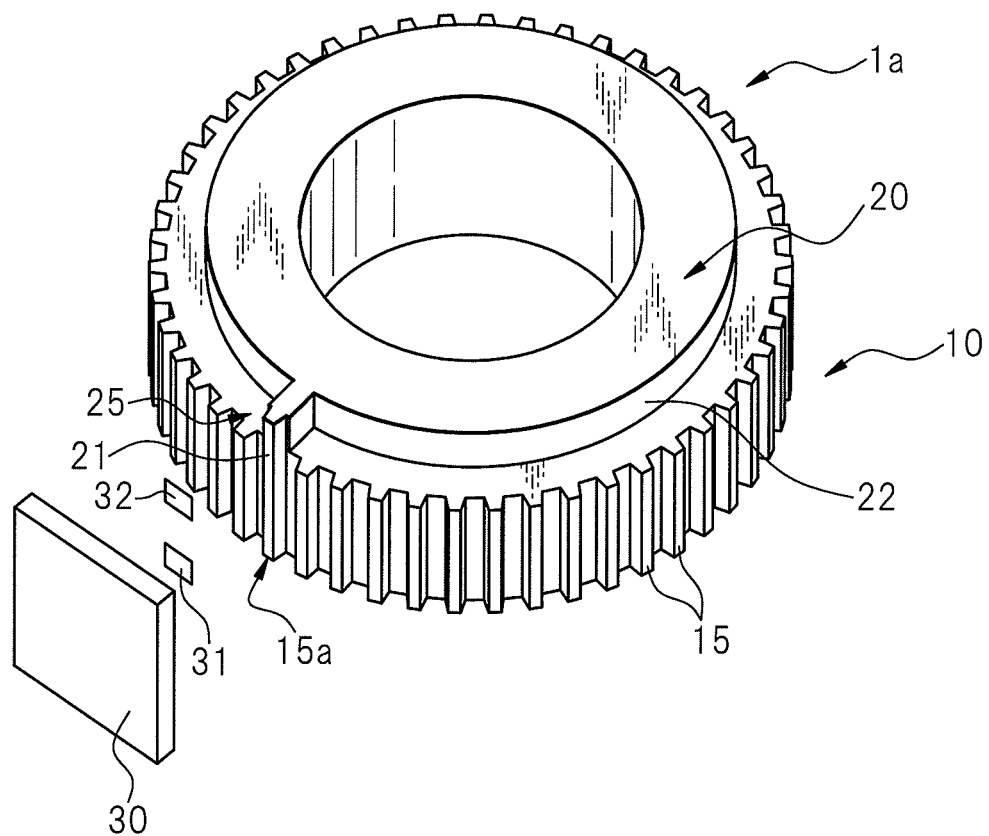
FIG. 2A is a perspective view of a rotor based on the first embodiment of the present invention.
Figure 2B:
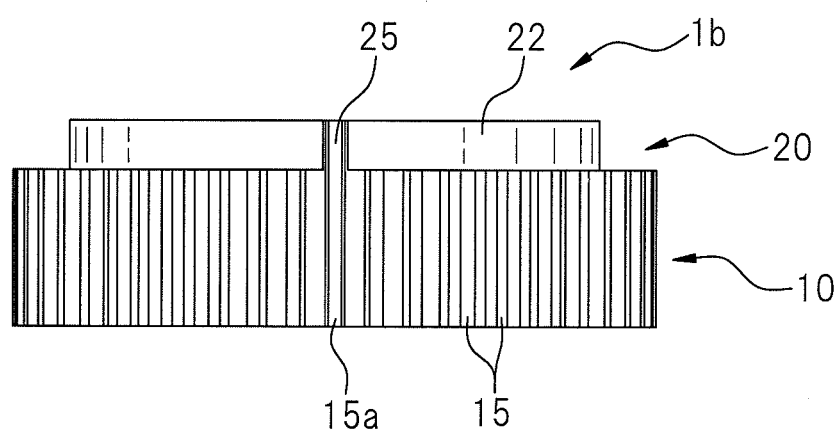
FIG. 2B is a side view of the rotor shown in FIG. 2A.
Figure 3A:
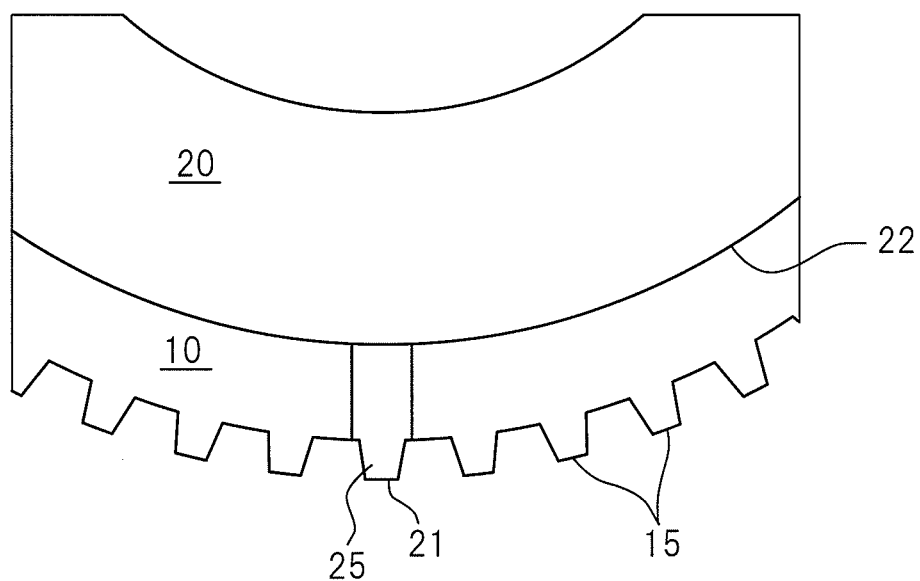
FIG. 3A is a partial top view of the rotor based on the first embodiment of the present invention.
Figure 3B:
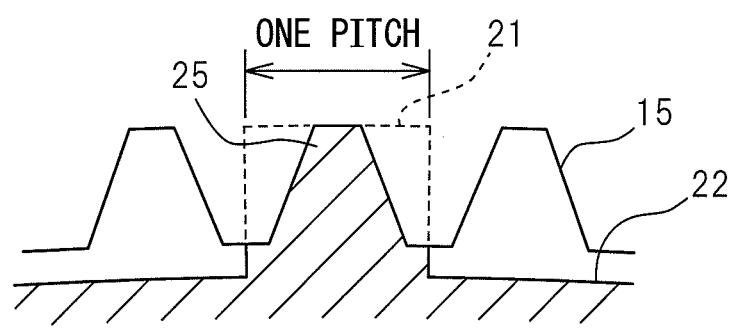
FIG. 3B is an enlarged view of a tooth formed on a first partial circumferential surface.

FIG. 2A is a perspective view of a rotor based on the first embodiment of the present invention, FIG. 2B is a side view of the rotor shown in FIG. 2A, FIG. 3A is a partial top view of the rotor based on the first embodiment of the present invention, and FIG. 3B is an enlarged view of the tooth formed on the first partial circumferential surface. In the first embodiment of the invention, the grindstone (not shown) of the grinder grinds both the AB-phase to-be-detected portion corresponding to the first cylindrical portion 10 and the Z-phase to-be-detected portion corresponding to the second cylindrical portion 20 in one operation. As can be seen from reference to FIGS. 1 and 2, a plurality of teeth 15 of the AB-phase to-be-detected portion are formed by grinding over the whole circumferential surface 11 of the first cylindrical portion 10. In this connection, as shown in FIGS. 3A and 3B, the second partial circumferential surface 22 is set to be positioned on the inside of the bottom of teeth 15 in the radial direction. Therefore, at the time of grinding the second partial circumferential surface 22, the grindstone (not shown) of the grinder is placed in the non-grinding state; i.e., the second partial circumferential surface 22 is not ground.

On the contrary, the first partial circumferential surface 21 of the second cylindrical portion 20 is in flush with the circumferential surface 11 of the first cylindrical portion 10. Therefore, at the time of grinding the circumferential surface 11 of the first cylindrical portion 10, the first partial circumferential surface 21 of the second cylindrical portion 20 is ground together therewith to form a tooth 25. As can be seen from FIGS. 2A and 2B, the tooth 25 of the second cylindrical portion 20 is continuous to a corresponding tooth 15a of the first cylindrical portion 10.

In this connection, to efficiently conduct the grinding operation, when the first partial circumferential surface 21 and the grindstone (not shown) are not facing each other, i.e., when the second partial circumferential surface 22 and the grindstone are facing each other, the grindstone is driven for the first cylindrical portion 10 so that teeth 15 of the AB-phase to-be-detected portion are formed only on the circumferential surface 11 of the first cylindrical portion 10. Only when the first partial circumferential surface 21 and the grindstone (not shown) are facing each other, the grindstone may be driven for the second cylindrical portion 20 to form a tooth 25 of the Z-phase to-be-detected portion.

Further, in the first embodiment as can be seen from FIG. 3B, the first partial circumferential surface 21 has a width (length in the circumferential direction) nearly equal to a pitch of the tooth 15. In the first embodiment, it is presumed that the grind-start position is determined so that only one tooth 25 is formed on the first partial circumferential surface 21.

Through to the above grinding operation, the rotor 1b of the shape shown in FIGS. 2A and 2B can be formed. In the present invention, even when forming the teeth 15 and 25 by machining, it is made possible to form the teeth 15a and the tooth 25 on the AB-phase to-be-detected portion and on the Z-phase to-be-detected portion as a unitary structure. In this connection, the first cylindrical portion 10 and the second cylindrical portion 20 may be constituted by a plurality of steps, respectively.

Referring to FIG. 2A, a magnet 30 is fixed facing a portion of the circumferential surface of the rotor 1b. The magnet 30 plays the role of a magnetic field generator that generates a magnetic field. Further, two reluctance elements 31 and 32 are fixed between the magnet 30 and the rotor 1b. As can be seen from FIG. 2A, the first reluctance element 31 is arranged at a position corresponding to the first cylindrical portion 10 of the rotor 1b while the second reluctance element 32 is arranged at a position corresponding to the second cylindrical portion 20 of the rotor 1b.

The magnetic flux from the magnet 30 returns back to the magnet 30 passing through the first reluctance element 31 and the second reluctance element 32 and through the first cylindrical portion 10 and the second cylindrical portion 20 of the rotor 1b. As the rotor 1b rotates about the center thereof being driven by a drive unit that is not shown, reluctances of the reluctance elements 31 and 32 vary due to the teeth 15 and 25. The rotational position and speed of rotation of the rotor 1b can be detected based upon the variations in the reluctance.

The first reluctance element 31 is an AB-phase signal sensor for detecting an AB-phase signal consisting of an A-phase signal and a B-phase signal of which the phases are shifted from each other. The AB-phase signals output from the first reluctance element 31 are counted by a detector unit to obtain the amount of rotation of the rotor 1b, while the direction of rotation of the rotor 1b is obtained from a phase between the A-phase signal and the B-phase signal.

The second reluctance element 32 is a Z-phase signal sensor for detecting a Z-phase signal that generates only once for every rotation of the rotor 1b. The Z-phase signal is used as a reference point for detecting the rotation. Pulse-like Z-phase signals are obtained if voltages output from the second reluctance element 32 are compared on a predetermined level.

Figure 4:
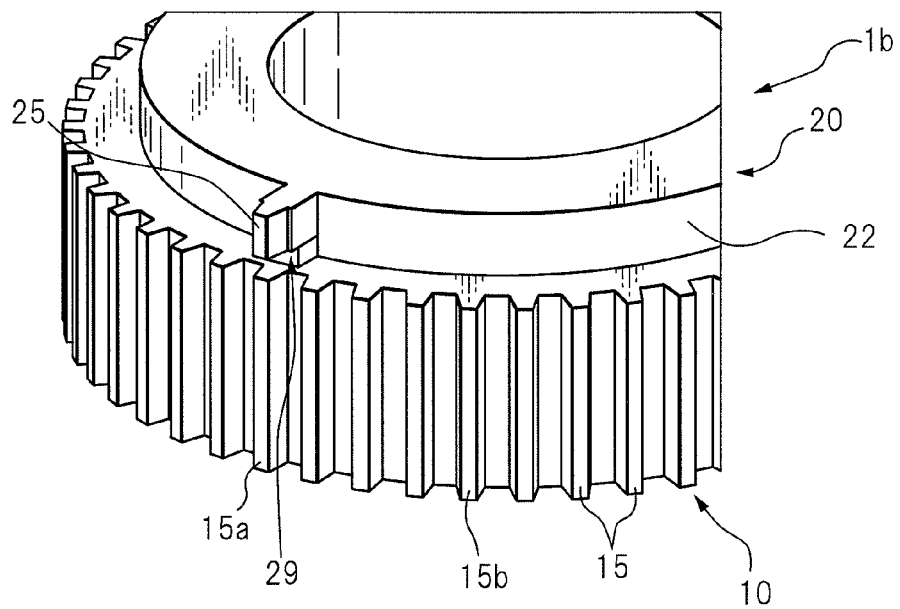
FIG. 4 is a perspective view of the rotor based on a second embodiment of the present invention.

FIG. 4 is a perspective view of the rotor based on a second embodiment of the present invention. In FIG. 4, the tooth 25 of the second cylindrical portion 20 is not continuous to the tooth 15a of the first cylindrical portion 10, but a groove 29 is formed between them. The groove 29 is desirably formed while the rotor blank 1a is being produced. However, the groove 29, may be formed after the teeth 15a and 25 have been formed.

Considered below is a case where the groove 29 has not been formed in the rotor 1b shown in FIG. 4. The magnetic flux detected by the first reluctance element 31 differs depending upon when the first reluctance element 31 is facing the tooth of the AB-phase to-be-detected portion that is not neighboring the tooth 25 of the Z-phase to-be-detected portion, i.e., when the first reluctance element 31 is facing the tooth 15b and when the first reluctance element 31 is facing the tooth 15a of the AB-phase to-be-detected portion neighboring the tooth 25 of the Z-phase to-be-detected portion.

This is because when the tooth 15a of the AB-phase to-be-detected portion neighbors the tooth 25 of the Z-phase to-be-detected portion, the magnetic flux distribution surrounding the AB-phase signal sensor is affected by the tooth 25 of the Z-phase to-be-detected portion. This could cause an error in the detection.

In the prior art, a large distance was maintained between the tooth 15a of the AB-phase to-be-detected portion and the tooth 25 of the Z-phase to-be-detected portion in order to decrease the effect of the tooth 25 of the Z-phase to-be-detected portion accompanied. As a result, the size of the rotor 1b was increased.

On the contrary in the second embodiment, the groove 29 is formed between the tooth 15a of the first cylindrical portion 10 and the tooth 25 of the second cylindrical portion 20. Therefore, the air having a low magnetic permeability is present in the groove 29 between the tooth 15a of the AB-phase to-be-detected portion and the tooth 25 of the Z-phase to-be-detected portion. As a result, the effect of the tooth 25 of the Z-phase to-be-detected portion can be decreased without increasing the distance between the two teeth 15a and 25.

The number of teeth 25 of the Z-phase to-be-detected portion varies depending upon the width of the first partial circumferential surface 21 of the rotor blank 1a in the circumferential direction and the grind-start position. In other words, the invention does not have to be limited to forming only one tooth 25 of the Z-phase to-be-detected portion.

Figure 5A:
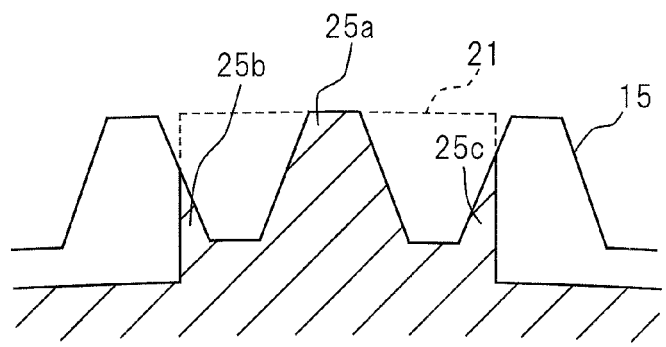
FIG. 5A is another enlarged view of the teeth formed on the first partial circumferential surface.
Figure 5B:
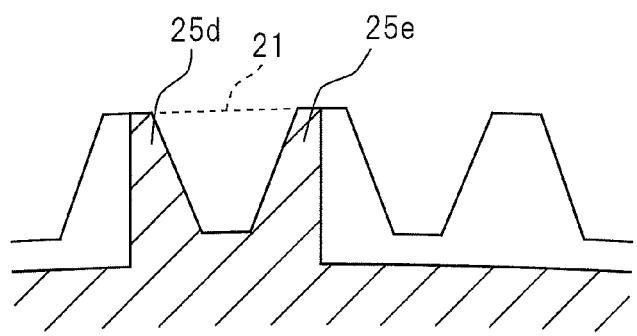
FIG. 5B is a further enlarged view of the teeth formed on the first partial circumferential surface.

FIGS. 5A and 5B are enlarged views of the teeth formed on the first partial circumferential surface. In FIG. 5A, on the first partial circumferential surface 21, there are formed a tooth 25a of the same shape as that of the teeth 15 formed on the AB-phase to-be-detected portion, as well as two teeth 25b and 25c which are partly of the same shape as that of the teeth 15. Further, referring to FIG. 5B, on the first partial circumferential surface 21, there are formed two teeth 25d and 25e which are partly of the same shape as that of the teeth 15 formed on the AB-phase to-be-detected portion. The rotor 1b partly shown in FIGS. 5A and 5B, too, can be similarly applied to the rotation detector.

Figure 6A:
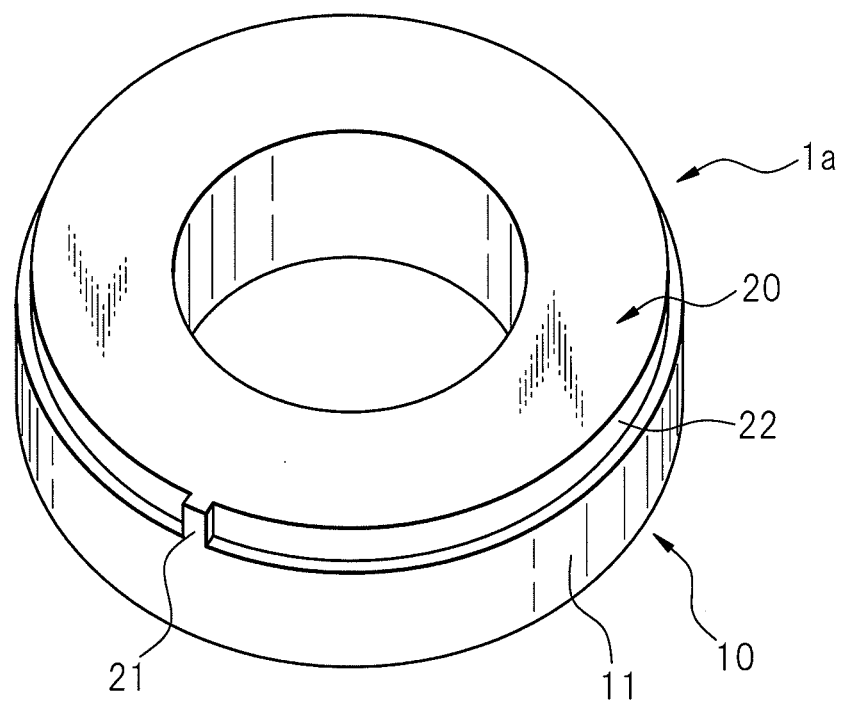
FIG. 6A is a perspective view of the rotor blank based on a third embodiment of the present invention.
Figure 6B:
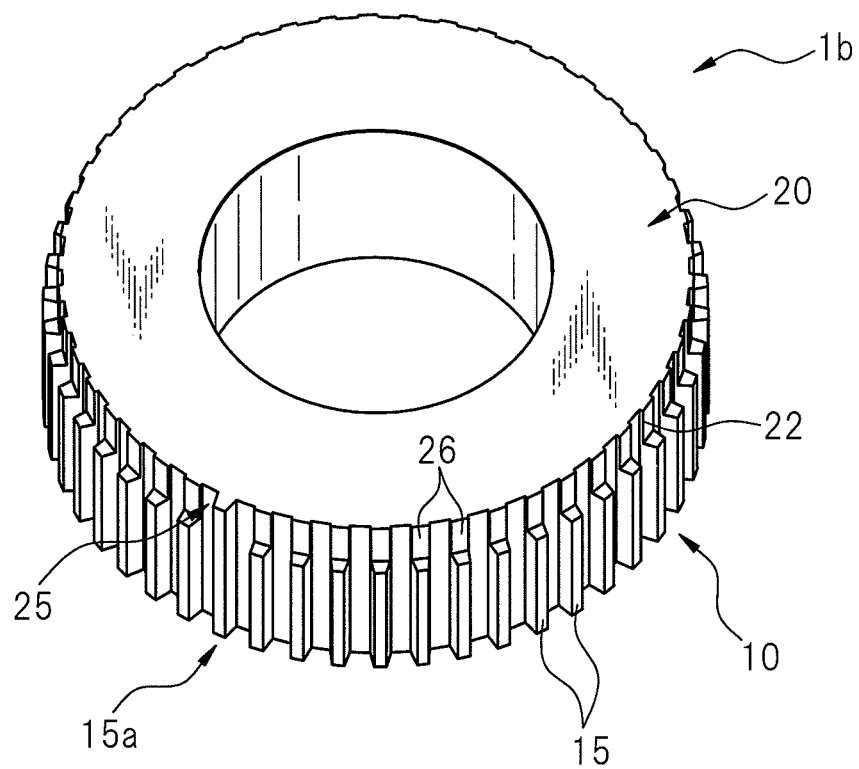
FIG. 6B is a perspective view of the rotor based on the third embodiment of the present invention.
Figure 7A:
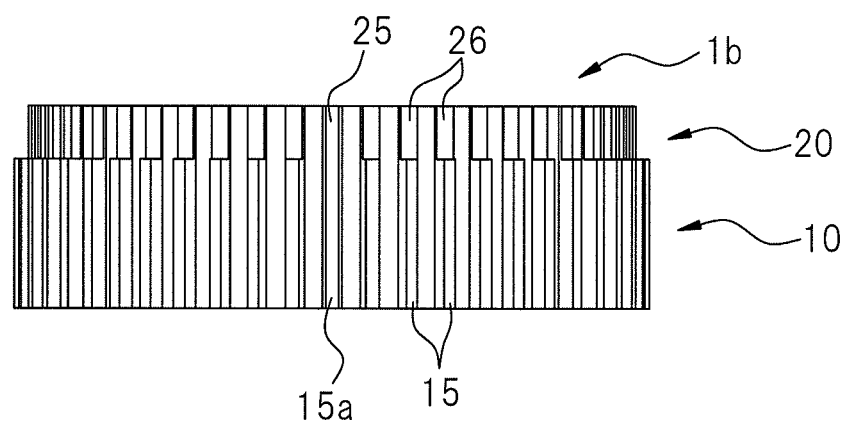
FIG. 7A is a side view of the rotor based on the third embodiment of the present invention.

FIG. 6A is a perspective view of the rotor blank based on a third embodiment of the present invention, and FIG. 6B is a perspective view of the rotor based on the third embodiment of the present invention. Further, FIG. 7A is a side view of the rotor based on the third embodiment of the present invention, and FIG. 7B is a partial top view of the rotor based on the third embodiment of the present invention.

The radius of the second partial circumferential surface 22 of the rotor blank 1a shown in FIG. 6A is slightly larger than a distance of from the center of the rotor 1b to the bottom of teeth 15 shown in FIG. 6B. The above rotor blank 1a is ground as described above to form a plurality of teeth 15 on the circumferential surface 11 of the first cylindrical portion 10. In this case as shown in FIGS. 6B and 7A, a single tooth 25 is formed on the first partial circumferential surface 21 of the second cylindrical portion 20 and a plurality of teeth 26 are formed on the second partial circumferential surface 22.

Figure 7B:
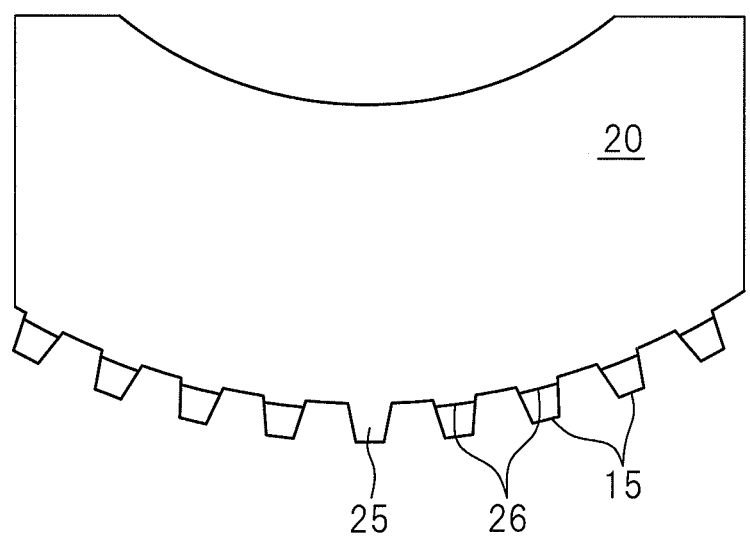
FIG. 7B is a partial top view of the rotor based on the third embodiment of the present invention.

Specifically, as can be seen from FIGS. 6B and 7B, the plurality of teeth 26 formed on the second partial circumferential surface 22 have a height which is very smaller than a height of the tooth 25. Therefore, the level of Z-phase signals obtained by detecting the small teeth 26 by the Z-phase sensor is negligibly smaller than the level of Z-phase signals obtained by detecting the large tooth 25. In other words, the level of Z-phase signals obtained by detecting the large tooth 25 can be electrically distinguished. Therefore, it will be obvious that the rotor 1b shown in FIGS. 6 and 7 is applicable to the rotation detector of the present invention.

Figure 8:
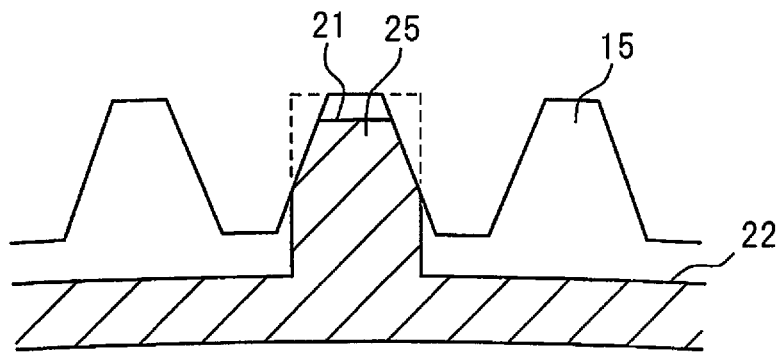
FIG. 8 is a still further enlarged view of the tooth formed on the first partial circumferential surface.
Figure 9:
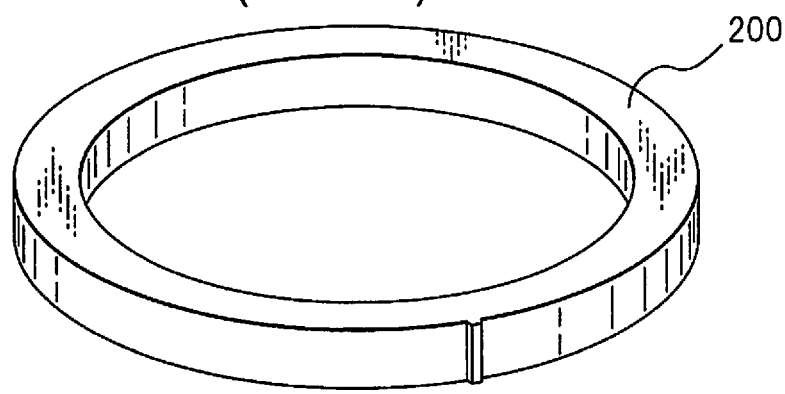
FIG. 9 is an exploded perspective view of a rotor of a rotation detector according to a prior art.
Figure 9:
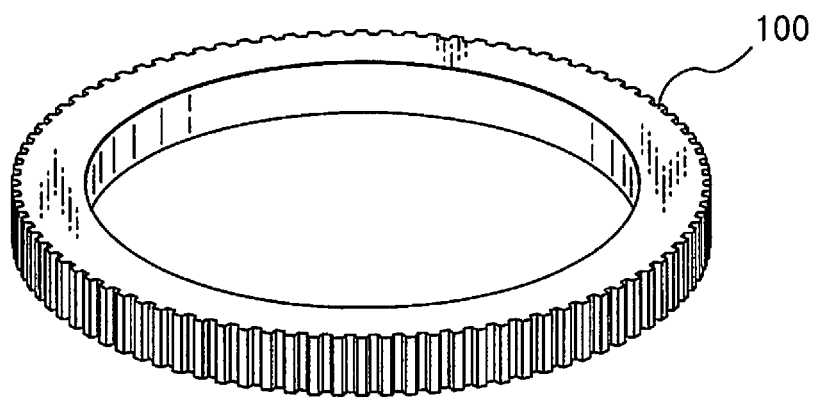

FIG. 8 is a still further enlarged view of the tooth formed on the first partial circumferential surface. In FIG. 8, the radius of the first partial circumferential surface 21 forming the tooth 25 is slightly smaller than the radius of the circumferential surface of the first cylindrical portion 10. In this case, the level of Z-phase signals obtained by detecting the tooth 25 by the second reluctance element 32 can also be sufficiently distinguished from the level of Z-phase signals obtained by detecting the second partial circumferential surface 22. Therefore, it will be obvious that the rotor partly shown in FIG. 8 is applicable to the rotation detector of the present invention.

Effects of the Invention

According to the first and fifth aspects, the teeth can be formed on the AB-phase to-be-detected portion and on the Z-phase to-be-detected portion as a unitary structure even when the teeth are formed by machining. Therefore, the rotor can be produced more efficiently than the prior art.

According to the second and sixth aspects, the rotor can be easily formed.

According to the third and seventh aspects, the air having a low magnetic permeability present in the groove works to lower the effect of the teeth of the second to-be-detected portion without the need of increasing the distance between the first cylindrical portion and the second cylindrical portion.

According to the fourth and eighth aspects, no groove is formed in the second partial circumferential surface despite the machining is carried out and, the level of Z-phase signals can be electrically distinguished with ease.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A rotation detector including a rotor, a magnetic field generator fixed to face said rotor and generates a magnetic field, and a detector unit arranged between said rotor and said magnetic field generator to detect signals that vary responsive to changes in said magnetic field caused the rotation of said rotor; wherein
    said rotor includes a first cylindrical portion having one or a plurality of steps, and a second cylindrical portion having one or a plurality of steps and arranged concentrically with said first cylindrical portion and being deviated in the axial direction; and
    said second cylindrical portion includes a first partial circumferential surface having a width narrower than that of said first cylindrical portion in the circumferential direction, and a second partial circumferential surface having a radius smaller than a radius of said first partial circumferential surface;
    said rotor, further, including:
    a first to-be-detected portion having a plurality of teeth formed on each of the steps of said first cylindrical portion; and
    a second to-be-detected portion having at least one tooth in phase with, and in the same shape and size as, the tooth of said first to-be-detected portion, said at least one tooth being formed on said first partial circumferential surface of said second cylindrical portion;
    wherein said at least one tooth of said second cylindrical portion and a tooth of said first cylindrical portion corresponding to said at least one tooth are formed in one operation by machining; and
    wherein said second partial circumferential surface of said second cylindrical portion is positioned on the inside of the bottom of teeth of said first to-be-detected portion in the radial direction.

2. The rotation detector according to claim 1, wherein the radius of the first partial circumferential surface of said second cylindrical portion is the same as the radius of said first cylindrical portion.

3. The rotation detector according to claim 1, wherein a groove is formed between said second cylindrical portion and said first cylindrical portion.

4. The rotation detector according to claim 1, wherein said second partial circumferential surface of said second cylindrical portion is on an outer side of said second cylindrical portion and is inwardly spaced, in the radial direction, from the bottom of the teeth of said first to-be-detected portion.

5. The rotation detector according to claim 1, wherein
    said second partial circumferential surface of said second cylindrical portion is on an outer side of said second cylindrical portion, and
    the radius of said second partial circumferential surface of said second cylindrical portion is smaller than a radius of the bottom of the teeth of said first to-be-detected portion.

* * * * *